United States Patent [19]

Forslund

[11] 4,412,777
[45] Nov. 1, 1983

[54] DEVICE FOR A FELLING AND GRIPPING UNIT

[75] Inventor: Erik T. Forslund, Alfta, Sweden

[73] Assignee: Ostbergs Fabriks AB, Alfta, Sweden

[21] Appl. No.: 247,244

[22] Filed: Mar. 25, 1981

[30] Foreign Application Priority Data

Apr. 2, 1980 [SE] Sweden ............................. 8002548

[51] Int. Cl.³ .......................... A01G 23/08; E02F 3/32
[52] U.S. Cl. .................................. 414/694; 144/3 D; 144/34 R
[58] Field of Search .................... 144/2 Z, 3 D, 34 R, 144/34 E, 336, 337, 338, 343; 414/694

[56] References Cited

U.S. PATENT DOCUMENTS 4,083,463 4/1978 Ericsson ............................ 144/34 R

FOREIGN PATENT DOCUMENTS 3010584 9/1980 Fed. Rep. of Germany .... 144/34 R
7803723 11/1979 Sweden .............................. 144/34 E Primary Examiner—W. D. Bray
Attorney, Agent, or Firm—Cushman, Darby & Cushman

[57] ABSTRACT

Apparatus for suspending a tree felling and gripping unit on a jib, the unit having a frame, and the apparatus including a rotator between the jib and a felling and gripping unit for rotation of the unit relative to the jib, the rotator having a stationary portion and an inner portion rotatable about an axis, the rotatable portion having a lower end; a horizontal axle pivotally suspending the stationary portion of the rotator from the jib; a first hydraulic device connected between the jib and the stationary portion of the rotator for swinging the rotator about the horizontal axle; a further axle extending perpendicularly to the rotation axis of the rotatable portion of the rotator and pivotally suspending the frame of the unit from the lower end of the rotatable portion of the rotator; and a second hydraulic device connected between the rotatable portion of the rotator and the frame of the unit for swinging the unit about the further axle.

6 Claims, 4 Drawing Figures

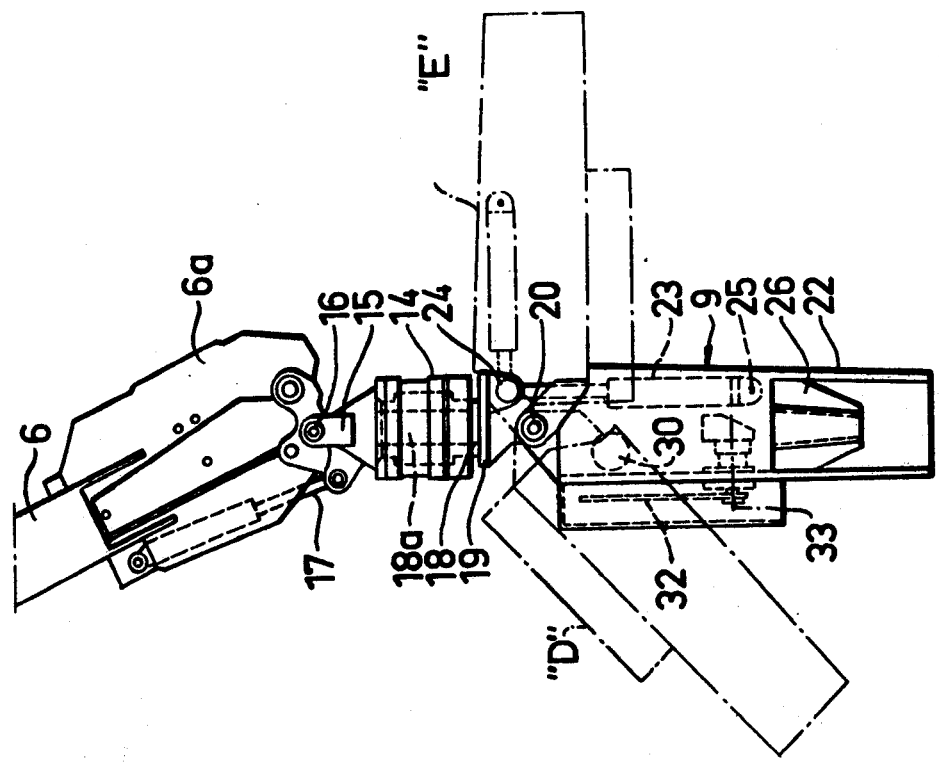
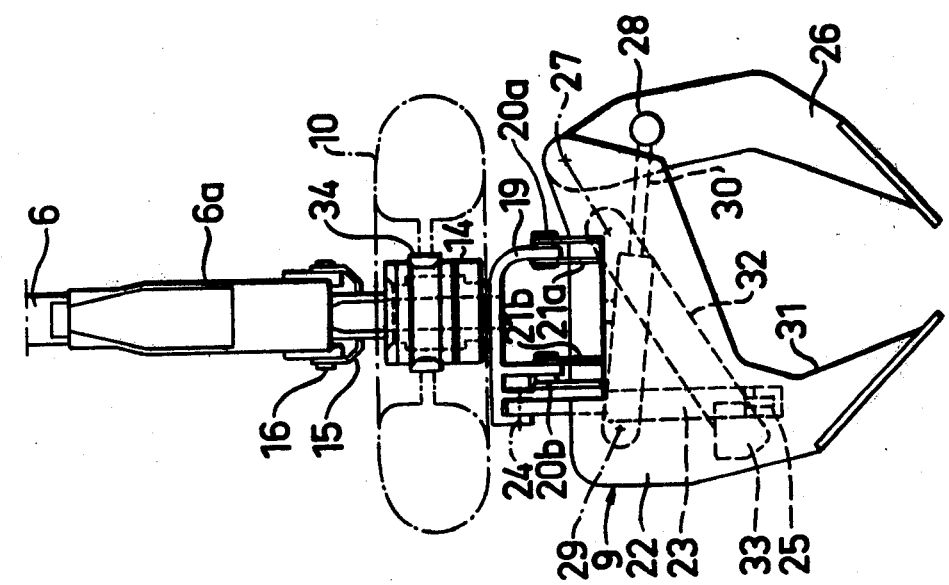

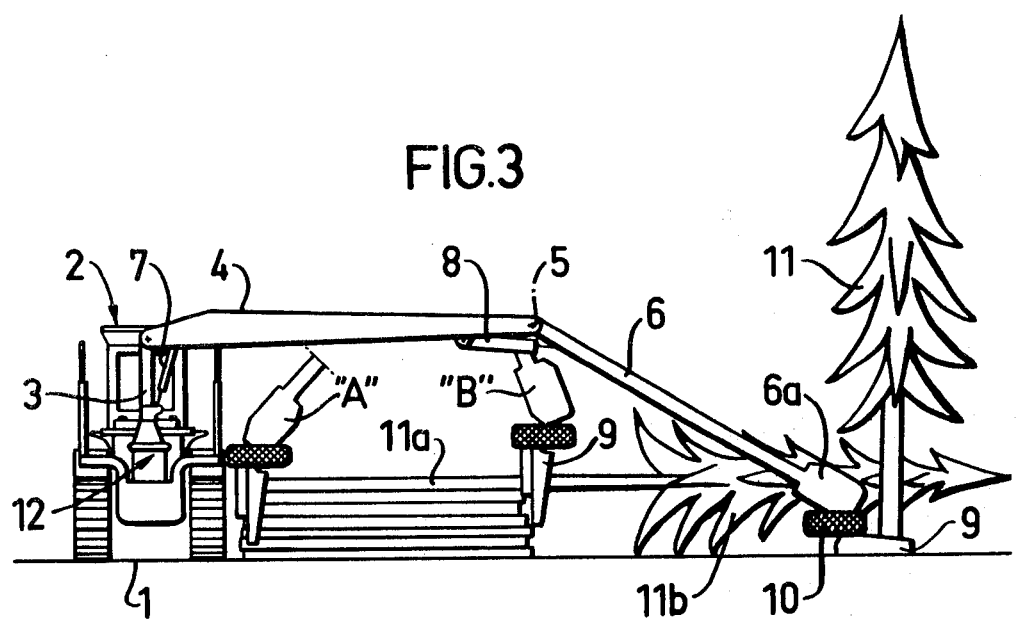
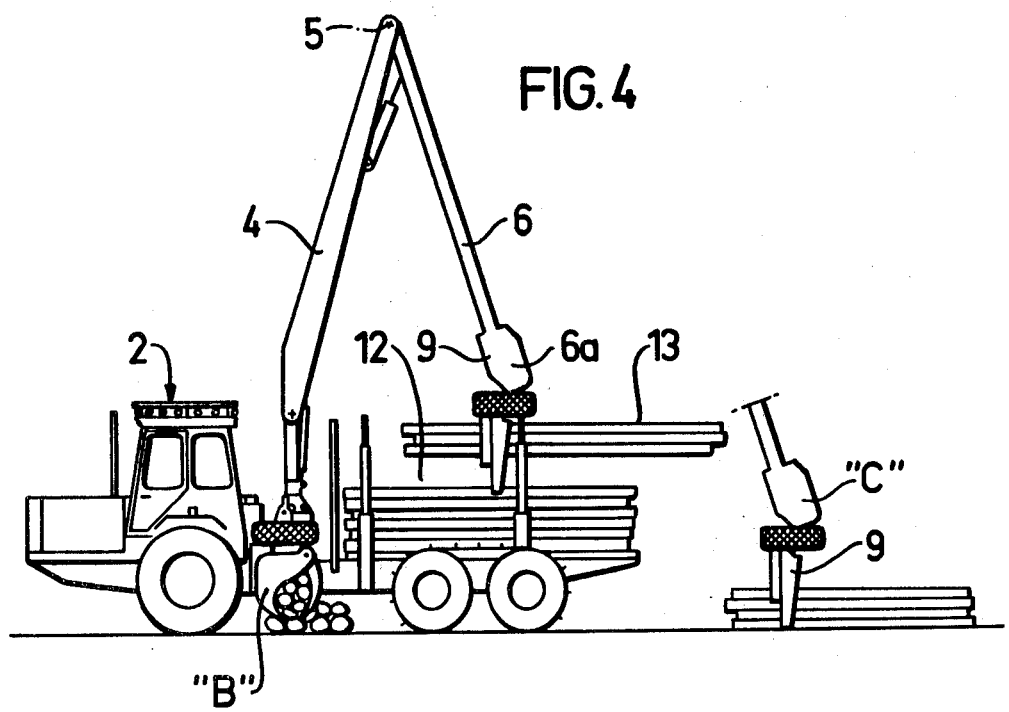

DEVICE FOR A FELLING AND GRIPPING UNIT

This invention relates to a felling and gripping unit, which via a rotator comprising an outer stationary portion and an inner rotatable portion is suspended at the end of the lifting jib of a knuckle boom extending from a working vehicle and can be controlled by hydraulic means from the driver's seat. The device is adapted especially for use in thinning.

During the last decade the interest has been focused on mechanical thinning in young forests. The costs of manual thinning have increased at such a rate that an economically acceptable result cannot longer be achieved thereby. Manual thinning, moreover, now involves very great difficulties in view of the physiologic and environmental aspects, which lately have been imposed on this type of work. Thinning is heavy work from a load point of view and also uncomfortable for the cutter when snow or rain droplets cover shrubs and trees in areas where the cutter has to work.

It was therefore proposed in recent years to use working vehicles with knuckle booms of great reach, at the end of which the lifting jib carries a felling and gripping unit, which is capable to fell the tree within the jib reach and to suitably position the tree or skid it to a suitable place, possibly back to the vehicle for loading. For this a felling unit is required which is equipped with grapple arms and adjustable between a position, in which the cutting plane substantially is horizontal for felling, and a position, in which the cutting plane forms an angle of at least 90° with the horizontal plane for skidding and cross-cutting felled trees.

A great problem in this connection involves the requirement of applying the unit accurately and distinctively to the stem, in view of the very tough working conditions for the unit as caused, for example, by the occurrence of stones near the tree, knots near the ground, high buttresses (root swells), understorey trees (shrub vegetation), snow hinders, trees inclined "in the wrong direction", diameter variations from about 5 cm up to about 70 cm and ground inclination. The design of the felling unit suspension, which heretofore has been most usual, (see for example Swedish Laid Out Document 410 814), and which permits a certain movement of free swinging in order to accommodate breaking forces, does not meet the aforesaid requirement.

This problem is solved efficiently, in that according to the present invention the stationary portion of the rotator at its upper end is mounted directly about a horizontal axle in the lifting jib end, and the rotatable rotor portion at its lower end carries an axle, which extends perpendicularly to the centre line of the rotator about which the frame of the unit is mounted, so that upon rotation of the rotor portion the swinging axle of the unit is forced to move in a plane in parallel with the swinging axle of the lifting jib and in adjacent planes, and that first hydraulic means are located directly between the lifting jib end and the stationary portion of the rotator, and second hydraulic means are located directly between the end of the rotor portion and the frame, so that in combination with the control of the rotator the unit can be adjusted in a distinct and fixed manner to any desired position.

Another problem is the risk that the felling unit when being applied to the selected tree, may scrub surrounding trees and thereby tear off the bark. The resulting damage on the tree often gives rise to decay and deteriorated future quality.

This problem as well as further problems are solved by developments of the invention as defined in the attached claims.

A preferred embodiment of the device according to the invention is described in the following, with reference to the accompanying drawings, in which FIGS. 1 and 2 are a schematic front view and, respectively, lateral view of the device, FIG. 3 is a schematic rear view of a working vehicle with a device according to the invention in three operating positions, and FIG. 4 is a lateral view of the vehicle and device at loading.

The felling unit generally designated by 9 in the Figures is suspended at the outer end 6a of a lifting jib 6 via a rotator 14, which with an upwardly projecting yoke 15 is mounted about an axle 16 carried by the jib end 6a. The pivotal position of the rotator in the vertical plane is adjustable by hydraulic means 17, the cylinder of which is supported at the jib end 6a, and the rod of which is supported at the rotator. In the rotator, an inner rotor portion 18 is mounted rotatably and operated hydraulically in a usual way about its central axis. A hole 18a extending axially through the rotor portion 18 receives all hydraulic conduits from the lifting jib to the hydraulic equipment of the felling unit. This arrangement prevents scraping and squeezing damages, which often give rise to problems in hydraulic hoses mounted conventionally outside the rotator. The rotor portion 18 includes a downwardly projecting yoke 19 with horizontal pivot pins 20a, 20b for bearing brackets 21a and, respectively, 21b on the frame 22 of the felling unit. The swinging movement of the frame in the yoke 19 is controlled by hydraulic means 23 between the points 24 and 25 on the yoke and the frame. The movement range of the frame is indicated in FIG. 2 by dash-dotted lines "D" and "E", which represent the cutting plane of the unit. The large range permits both the felling of trees and the cross-cutting of felled trees. A grapple arm 26 is pivotally mounted at the frame 22 via a joint 27 and controlled by hydraulic means 30 located between the points 28 and 29 on the arm and frame. The frame has a grip edge 31 for co-operation with the grapple arm 26. In a place on the frame opposite to the grapple arm joint 27 a hydraulically controlled saw guide bar 32 with a hydraulically operated saw chain is mounted in a point 33 and can be swung outward from a position (obscured) inside of the grip edge 31 and thereby cross-cut wood retained between the grip edge and the grapple arm. This arrangement permits the handling of trees, trunks and logs without being obstructed by the sawing equipment.

By the hydraulic means 17 and 23 for the rotator 14 and, respectively, frame 22 and by hydraulic rotation of the rotor portion 18 of the rotator, the felling unit 9 can be set accurately and be fixed in desired position within a very large action range, either for tree felling or for cross-cutting felled trees and for handling cross-cut wood to be loaded or unloaded. The conventional unfavourable free swinging movement of the unit for taking up the inclined position of a.o. a felled tree, thus, has been replaced at the invention by a rotary movement of the rotator and a simultaneous swinging of the unit frame. In order to accomodate possible breaking forces in connection with felling and handling, which forces are reduced to a minimum by the short distance between the swinging axles 16 and, respectively, of the rotator and frame, overflow valves are provided in the hydraulic system.

The risk of scrubbing surrounding trees at the extension and withdrawal of the unit has already been mentioned above. In FIG. 1 a tree-sparing protection against tearing is shown schematically, which has the form of a wheel 10 with a hub 34 mounted about the rotator 14. This design has been rendered possible by the fact, that no hydraulic hoses are located on the outside, because as mentioned they are drawn through the central hole 18a of the rotator 14. The wheel 10, which not necessarily must form a closed ring, but may be open or divided into several segments, is provided with an elastic outer surface, for example a soft rubber coat. Upon contact with trees not concerned, the trees are softly pushed aside at the rolling of the wheel.

The mode of operation is briefly described in the following with reference to FIGS. 3 and 4.

In FIG. 3 the numeral 1 designates a strip road, on which a working vehicle 2 is standing, which carries a post 3, on which a base boom 4 with the lifting jib 6 connected via a joint 5 is secured so as to be pivotal in lateral and vertical direction. The setting of the angular positions in vertical direction of the boom and jib is effected by hydraulic means 7 and, respectively, 8.

At the outer end 6a of the lifting jib 6 the felling and gripping unit 9 according to the invention with the tree-sparing tear-protection 10 is mounted.

For thinning (felling), the knuckle boom 4,6 is folded out to the selected tree. During the felling moment, which in FIG. 3 is indicated by fully extended boom and jib 4 and, respectively, 6, the unit 9 embraces firmly the tree 11 selected for thinning immediately above the ground. The sawing equipment (guide bar 32) thereafter is caused to saw off the tree, which falls down to the ground while the unit still maintains it gripped. Thereafter the boom and jib are folded about the joint 5 so that the unit holding the tree in its grip is skidded to position "A" very near the vehicle 2 on the strip road 1. Here the tree is released, whereby the working cycle is completed, if the object has been to collect the root ends of the trees to the side of the strip road.

When the object is to both fell and transport away the thinned wood, the working cycle continues, in that the unit 9 after having released the tree is operated to position "B" for again gripping the tree, which thereafter is lifted in its entirety and positioned in a loading space 12 on the vehicle (see FIG. 4). When the tree has considerable length, the unit is caused to cross-cut the tree at the position "B" and to position the root end portion in the loading space, whereafter the unit is operated to the remaining top end portion 11b for lifting also this portion to the loading space. The cross-cutting operation can be carried out rapidly and accurately owing to the entirely controlled and non-swinging application of the unit to the tree stem. The subsequent handling, too, is facilitated.

When the tree has a small diameter, the working cycle can be modified in such a way, that several felled trees are collected at the strip road to form a bundle (position "A"), whereafter the felling unit 9 is caused to embrace the entire tree bundle (or a part thereof) at the position "B", to cross-cut the bundle in one operation and to lift the bundle parts 13 (FIG. 4) to the loading space 12. The bundling and cross-cutting operations alternatively may be shifted to a suitable place (indicated at position "C") spaced from the strip road, for example all the way out to the maximum boom reach. Hereby obviously time and work is saved compared with the method of taking one tree per cycle to the strip road.

The advantages of the invention certainly are utilized best at thinning, but the working vehicle equipped in the manner described above also is well adapted for final felling.

The invention is not restricted to the embodiments and modifications described above, but various alterations can be imagined within the scope of the invention as it is defined in the attached claims.

What I claim is:

1. Apparatus for suspending a tree felling and gripping unit on a jib, said unit having a frame, said apparatus comprising: a rotator between the jib and a felling and gripping unit for rotation of said unit relative to the jib, said rotator having a stationary portion and an inner portion rotatable about an axis, said rotatable portion having a lower end; a horizontal axle pivotally suspending the stationary portion of the rotator from the jib; first hydraulic means connected between the jib and the stationary portion of the rotator for swinging the rotator about said horizontal axle; a further axle extending perpendicularly to the rotation axis of the rotatable portion of the rotator and pivotally suspending the frame of said unit from the lower end of the rotatable portion of the rotator; and second hydraulic means connected between said rotatable portion of the rotator and the frame of said unit for swinging said unit about said further axle.

2. Apparatus as in claim 1 including a yoke fixed to the lower end of the rotatable portion of the rotator, said further axle being carried by said yoke, and said second hydraulic means having one end pivotally connected to said yoke at a location offset from said further axle and having an opposite end pivotally connected to the frame of said unit.

3. Apparatus as in claim 1 wherein the frame of said unit is formed with a gripping portion for cooperation with a grapple arm which is pivotally mounted at an opposed point at the upper portion of the frame and actuated by hydraulic means located between respective points on the grapple arm and frame, and wherein a hydraulically controlled and operated saw guide bar with chain is pivotally mounted on the frame to be swung out from a position concealed by the gripping portion to fell and, respectively, cross-out the embraced tree.

4. Apparatus as in claim 1 wherein the rotatable portion of said rotator is provided with an axial through hole for receiving all hydraulic conduits extending from the lifting jib to the hydraulic means of the unit.

5. Apparatus as in claim 1 wherein said unit includes tree tear protection means surrounding forward and side portions thereof, said tree tear protection means being formed in the shape of a ring and having a soft outer surface.

6. Apparatus as in claim 5 wherein said tree tear protection means is a wheel, the hub of which is mounted about the rotator.

* * * * *